United States Patent [19]  
Sharp

[11] Patent Number: 4,645,170  
[45] Date of Patent: Feb. 24, 1987

[54] OUTSIDE REAR VIEW MIRROR
[75] Inventor: Bernard C. Sharp, White Plains, N.Y.
[73] Assignee: Parker-Hannifin Corporation, Shelton, Conn.
[21] Appl. No.: 843,131
[22] Filed: Mar. 24, 1986
[51] Int. Cl.⁴ .............................. B60R 1/06; G02B 5/08
[52] U.S. Cl. ...................................... 350/632; 248/478; 248/484
[58] Field of Search ............................. 350/632, 639; 248/478–484

[56] References Cited
U.S. PATENT DOCUMENTS

| | | | |
|---|---|---|---|
| D. 175,898 | 10/1955 | Malachowski | D14/6 |
| D. 181,222 | 10/1957 | Morgenstern | D14/6 |
| D. 182,382 | 3/1958 | Rossi | D14/6 |
| D. 213,183 | 1/1969 | Strater | D14/6 |
| D. 268,575 | 4/1983 | Sharp | D12/187 |
| 2,726,575 | 12/1955 | Koonter | 248/483 |
| 3,439,646 | 4/1969 | Helle | 116/124 |
| 3,474,998 | 10/1969 | Talbot | 248/483 |
| 3,512,746 | 5/1970 | Vitaloni et al. | 248/483 |
| 3,603,555 | 9/1971 | Lohr | 248/481 |
| 4,084,886 | 4/1978 | Grosch et al. | 350/281 |
| 4,244,548 | 1/1981 | Sharp | 248/481 |
| 4,256,375 | 3/1981 | Sharp | 350/289 |
| 4,286,841 | 9/1981 | Deshaw | 350/289 |
| 4,318,590 | 3/1982 | Hanley | 350/289 |
| 4,320,554 | 3/1982 | Tamura et al. | 15/250 B |
| 4,394,066 | 7/1983 | Sharp | 350/307 |
| 4,449,796 | 5/1984 | Janssen et al. | 350/582 |
| 4,466,594 | 8/1984 | Sharp | 248/484 |

Primary Examiner—Jon W. Henry  
Attorney, Agent, or Firm—Albert C. Johnston

[57] ABSTRACT

The mirror head of an outside rear view mirror is constituted by a mirror assembly mounted as a unit inside a housing having an upright front opening bounded by housing wall portions which converge in backward direction and, laterally, include a lower wall portion merging via an inner lower wall portion into an upwardly extending inner wall portion adapted to be positioned close to a window area of an automobile. The mirror assembly comprises a support bracket extending at an angle from a bracket foot portion mounted on the inner lower wall portion of the housing to a free end portion of the bracket which, through connections including a tensioned ball joint, holds a reflecting mirror plate securely yet adjustably positioned inside the housing opening. A head adaptor member fixed to the inner lower wall portion of the housing protrudes from it to a resettable connection with a mounting bracket to be fixed to the vehicle, as to a car door at the driver's seat, by which connection the angular position of the mirror head relative to the mounting bracket can be selected and set so as to position the mirror plate azimuthally as desired for the driver's range of vision. The arrangement is adaptable to both left-side and right-side outside rear view mirrors.

10 Claims, 9 Drawing Figures

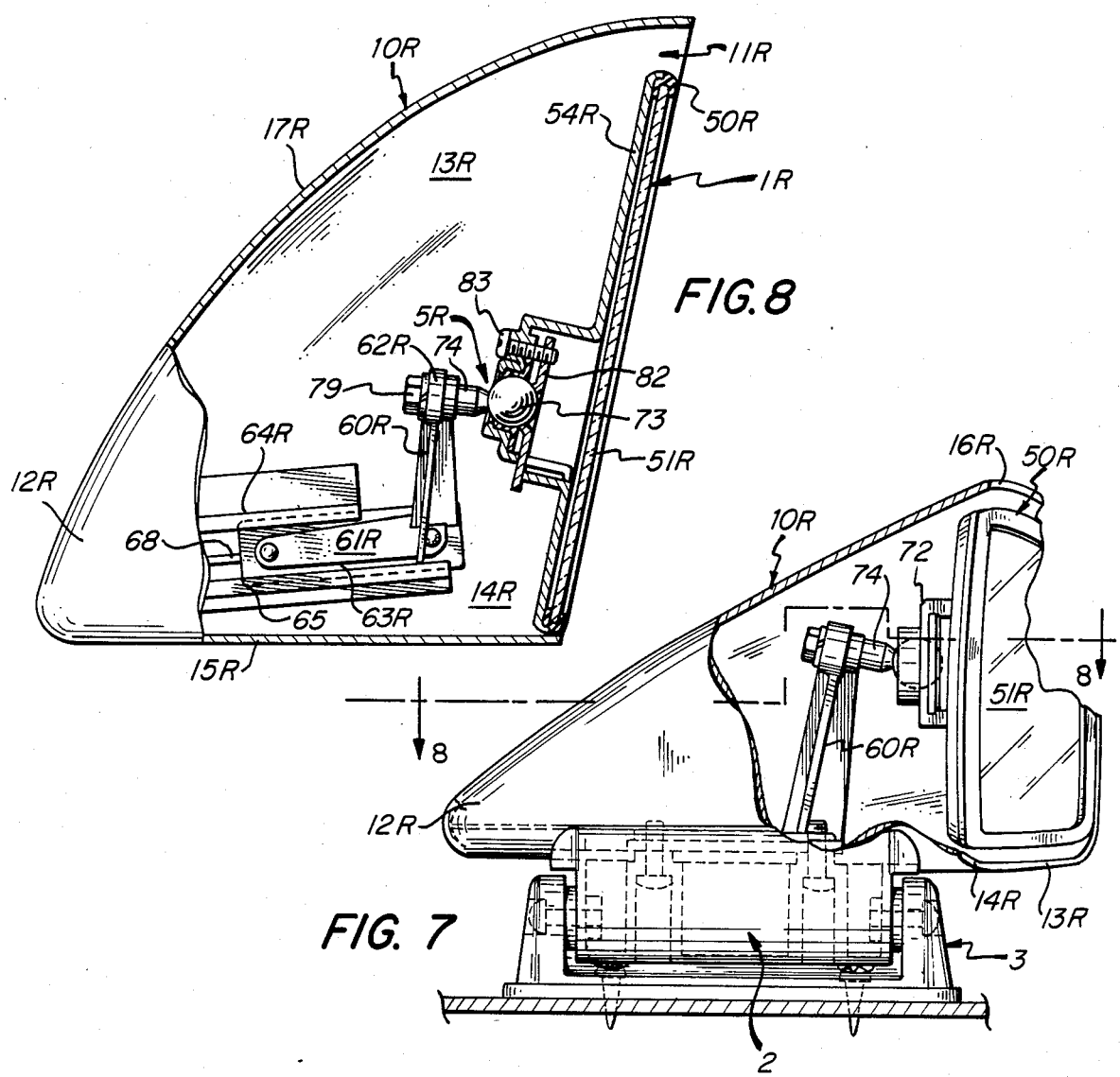
FIG. 8
FIG. 7
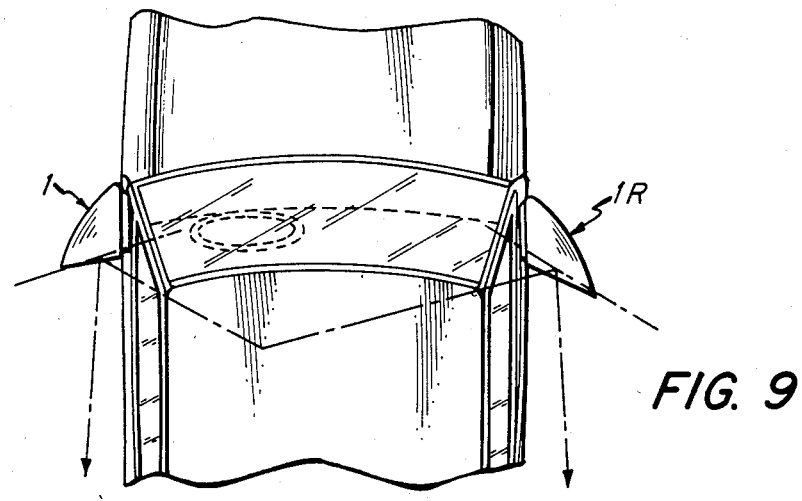
FIG. 9

OUTSIDE REAR VIEW MIRROR

This invention relates to a rear view mirror of a type suited for being mounted to the outside of a motor vehicle, such as on a door and close to a window area of an automobile, to enable good rearward vision for the driver of the vehicle.

An object of the invention is to provide an improved rear view mirror construction of that type with which enhanced rearward vision can be obtained along with reduced wind drag and extensive adjustability of the mirror viewing angles to suit needs of different drivers of a vehicle equipped with the mirror.

Another object of the invention is to provide a rear view mirror construction of the type mentioned that can be produced efficiently with correct assembly of the mirror plate inside a protective mirror head by a kind of "blind" assembly inside the head, with fastening from outside it, of structures supporting the mirror plate.

A further object is to provide an improved structure for mounting a rear view mirror to a vehicle, with which the mirror head can be disposed securely at any selected height within a range of heights to accommodate the line of vision of a driver of the vehicle.

An outside rear view mirror according to one feature of the invention comprises a mirror head constituted by a housing having laterally joined, backwardly extending wall portions that circumscribe a generally upright front opening of the mirror head and include a lower wall portion merging laterally via an inner lower wall portion with an upwardly extending inner wall portion; and inside the housing a mirror assembly is provided which includes a mirror plate, typically a flat silvered glass plate, to occupy the front opening, a mirror support bracket spaced behind the mirror plate and extending upwardly and outwardly to a free end portion of the bracket from a foot portion thereof mounted onto the inner lower wall portion of the housing, and means interconnecting the mirror plate and the bracket end portion for holding the plate firmly yet adjustably in a selected viewing position relative to the housing.

The mirror support bracket thus extends to its free end portion from a lower inner corner region of the housing at an acute angle relative to the lower wall portion of the housing, with its end portion disposed behind the mirror plate at a location where, via the interconnecting means, the mirror plate is held securely in a desired viewing position inside the front opening yet is readily adjustable to any of various angular dispositions to suit different drivers.

According to another feature of the invention, the foot portion of the mirror support bracket is mounted in place by retainer means thereon slidingly engaged with retaining means fixed to and extending backward on the inner lower wall portion of the housing so that, in a limiting backward position of the retainer means, the foot position is held in the position required for correctly locating the mirror assembly inside the housing. In this way, the mirror assembly can be prepared as a separate unit and can be assembled correctly inside the housing simply by engaging the retainer means on the bracket foot portion with the retaining means on the housing wall and pushing the unit backward to the limiting position and then fixing it in place by a "blind" fastening of the foot portion effected from outside the housing.

A further feature of the invention resides in an improved arrangement and manner of operation of a mirror head adaptor member and a mounting bracket adapted to be fastened onto a body part of a vehicle, such as on a door at the driver's seat of an automobile, by which the mirror head is held securely yet adjustably at a selected angular position relative to the mounting bracket so that the height of the mirror on the vehicle will suit the seat height and range of vision of the driver.

The above-mentioned and other objects, features and advantages will be further evident from the following description and the accompanying drawings of illustrative embodiments of the invention. In the drawings:

FIG. 7 is an elevational view, with the mirror head shown partly in section, of the inner side of another embodiment of the invention which is adapted for use on the right-hand door at the driver's seat of an automobile;

Figure 2:
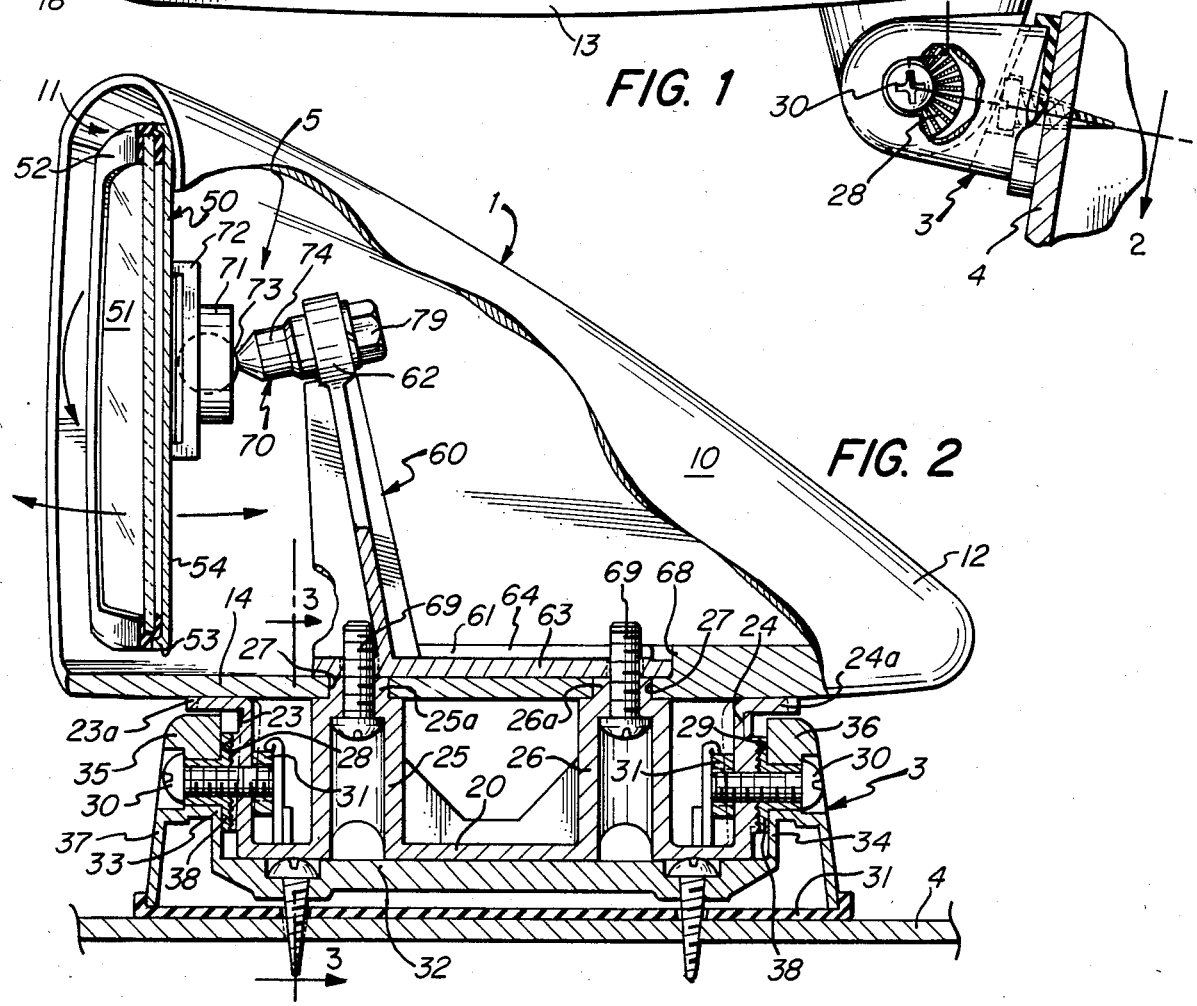
FIG. 2 is a longitudinal cross sectional view taken along the line 2—2 in FIG. 1.

FIG. 8 is a cross-sectional and plan view of the mirror plate and its supporting structures inside the mirror head housing, as viewed approximately along line 8—8 in FIG. 7; and FIG. 9 is a schematic diagram of an automobile provided with a rear view mirror substantially according to FIG. 2 on the left-hand door at the driver's seat, and with a rear view mirror substantially according to FIG. 7 on the right hand door.

The rear view mirror of the embodiment of the invention illustrated in FIGS. 1-5 of the drawings comprises a mirror head indicated generally by reference numeral 1, a head adaptor member 2 which is fastened to and protrudes downward from a housing member 10 of the mirror head, and a mirror mounting bracket 3 which is adapted to be positioned and fastened onto a body part of a vehicle, such as an upper part 4 of a body door at the driver's seat on the left-hand side of an automobile, so as to provide in a driver's range of vision a desirable clear view to the rear of the vehicle.

The mirror head 1 comprises inside the housing 10 a mirror assembly 5 which includes a mirror plate member 50, a support bracket 60 spaced behind the mirror plate member, and interconnecting means 70 between the mirror plate member 50 and the support bracket 60 for holding the mirror plate 51 of member 50 firmly yet adjustably in any selected position within a wide range of selectable viewing positions relative to the housing 10.

The housing 10 of the mirror head in an arrangement according to the present invention can be formed with a smooth aerodynamic profile extending, as viewed by a driver, backward from a relatively large front opening 11 at its forward end, with generally convergent contours, to a somewhat pointed backward end portion 12 which readily receives and guides wind currents over the housing wall portions sloping outward and away from it to the opening 11 so that there is relatively little wind drag in use of the mirror on a vehicle traveling at high speed.

The front opening 11 of the housing normally stand upright. It is circumscribed by laterally merged housing wall portions which extend backwardly with appropriate sloping to the pointed housing end 12. These wall portions include a lower wall portion 13 joined laterally via an inner lower wall portion 14 with an upwardly extending inner wall portion 15. The inner wall portion 15 merges laterally through a curved corner portion with an upper wall portion 16 which in turn merges through a curvature with an outer wall portion 17 that extends through a curved lower outer corner 18 to merge with the lower wall portion 13.

The mirror plate member 50 comprises essentially a light-reflecting mirror plate 51, such as a flat silvered glass plate, suitably shaped to occupy the housing opening 11 with clearance from the bounding housing wall portions so that the mirror plate can be disposed in any of a wide variety of angular positions relative to the housing. In the illustrated embodiment, the mirror plate 51 has a protective edge member or gasket 52 of rubber or other elastomer material encompassing and extending about its entire perpheral edge. This edge member is seated inside a peripheral flange 53 of rigid backing plate 54 through which the mirror plate is supported in desired viewing position inside the housing opening.

Figure 1:
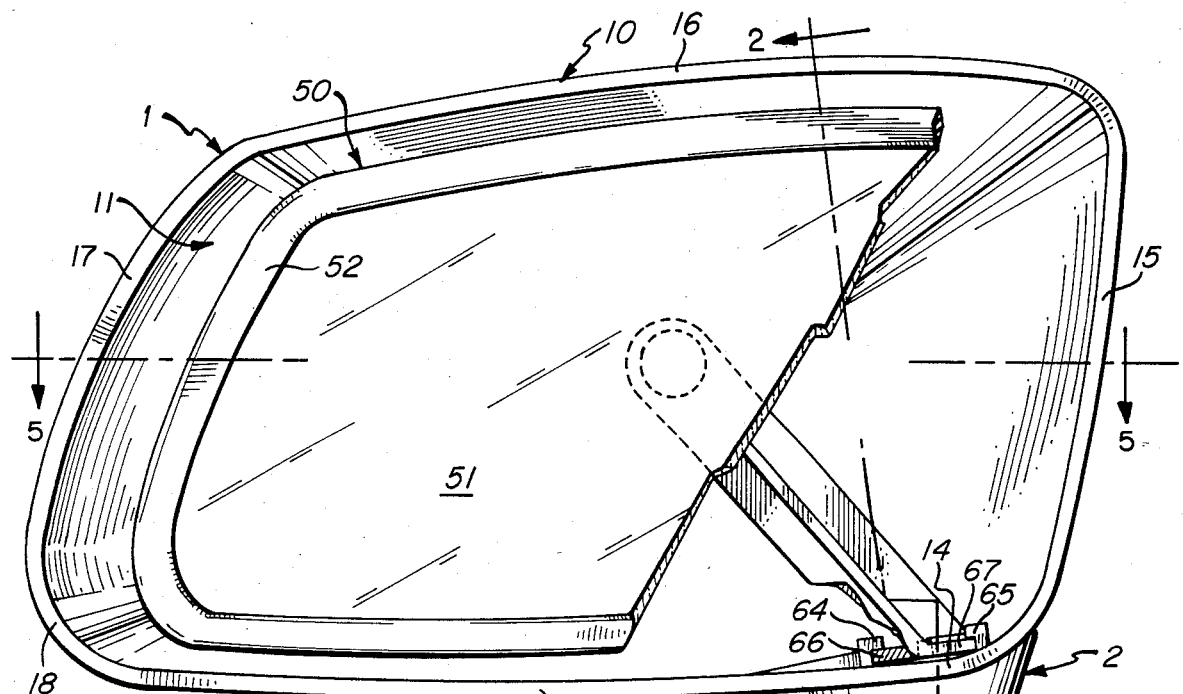
FIG. 1 is a front elevational view, partly broken away and partly in section, of an outside rear view mirror assembly adapted for use on the left-hand door at the driver's seat of an automobile.
Figure 5:
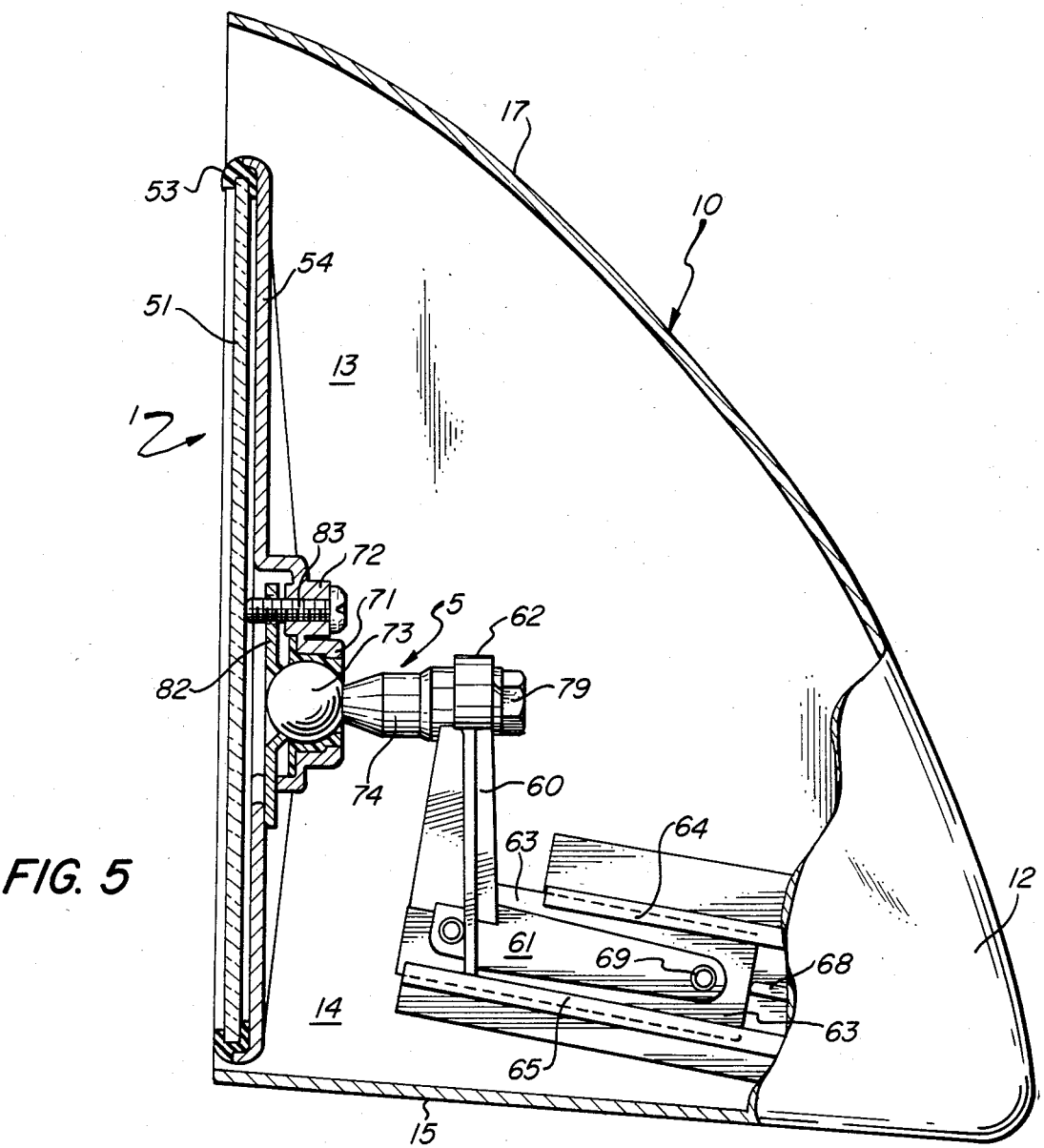
FIG. 5 is a cross sectional and plan view of the mirror plate and its supporting structures inside the mirror head housing, as viewed approximately along line 5—5 in FIG. 1.

The supporting of the mirror plate is effected primarily by the mirror support bracket 60 which has a foot portion 61 mounted onto the inner lower wall portion 14 of the housing and extends upwardly and outwardly, as seen in FIGS. 1 and 5, to a free end portion 62 of the support bracket. The end portion 62 is disposed in or near a central region of the mirror plate 51 and is connected with the mirror plate by the interconnecting means 70.

The interconnecting means 70 in the illustrated embodiment of the invention includes with the mirror backing member 54 a ball joint constituted by a socket member 71 fixed to the backing member 54 through a bracket 72, and a spherical ball 73 which is seated turnably in the socket member and has a ball post 74 extending backward from it and fastened rigidly to the free end portion 62 of the mirror support bracket 60. Turning movement of the socket member and mirror plate relative to the ball post 74 is resisted by the friction of a ball tensioning plate 82 (FIG. 5) which bears against the ball 73 seated in the socket member 71 and is held adjustably to a desired tension against the ball by a screw 83 passed through the bracket 72 and threaded into a free end portion of the tensioning plate.

The foot portion 61 of the mirror support bracket is mounted in place inside the housing by a suitable retainer means thereon slidingly engaged with retaining means fixed to and extending backward inside the housing on the lower inner wall portion 14 thereof so that, in a limiting backward position of the retainer means, the foot portion 61 and bracket 60 are disposed at the location required for correctly positioning the mirror assembly 5 inside the housing. The retainer means on the bracket foot portion as shown comprises a rigid slide member 63 extending backward inside the housing. This slide member is slidingly engaged with retaining means which, in the embodiment shown, comprise laterally spaced flanges 64 and 65 fixed to housing wall portion 14. The flanges form a trackway slidingly engaged with side edge portions 66 and 67 of the slide member to position the mirror assembly in the housing. An abutment 68 at the backward end of the trackway limits the backward movement of the slide member 63 relative to the housing.

It will be evident that with the mirror plate member 50, the mirror support bracket 60 and the interconnecting mean 70 suitably pre-assembled, the entire mirror assembly 5 can be assembled correctly inside the housing 10 by simply engaging the slide member 63 on the foot portion of support member 60 in the trackway formed by flanges 64 and 65 and then pushing the assembly backward to its limiting position in the trackway. The mirror assembly 5 then can be fastened securely in place by any suitable means such, for example, as screws 69 passed through the housing wall portion 14 and through threaded openings in the slide member 63 from a location outside the housing 10.

Figure 6:
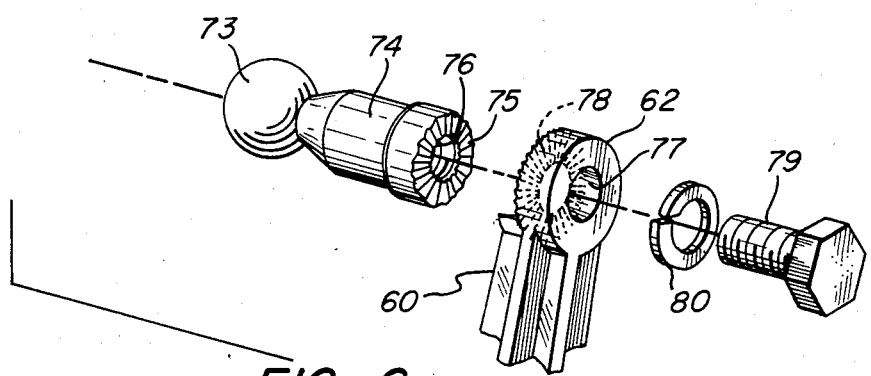
FIG. 6 is an exploded view of a swivel ball post and related parts by which the mirror plate is fixed to the free end portion of a mirror support bracket.

The pre-assembly outside the housing of the mirror plate member 50 with the support bracket 60 via the interconnecting means 70 can be effected advantageously by means of a connecting arrangement as shown in FIG. 2, and more particularly by the exploded view in FIG. 6. The ball post 74 is formed with a radially serrated end face 75 extending about a screw threaded bore 76 formed into the end of the post. The free end portion 62 of the support bracket 60 is formed with a central opening 77 and has a radially serrated forward side face 78 that mates and will interlock with the serrated end face 75 on ball post 74 when these faces are placed together, irrespective of either the disposition of the ball post angularly about its axis or the angular dispositon of the support bracket.

A headed screw 79 is passed through the opening 77 of the bracket end portion and screwed into the bore 76 in the ball post, thus clamping the ball post to the end of the support bracket with the serrated faces 75 and 78 interlocked. The mirror plate member 50 and the support bracket 60 thus are securely interconnected in and held against being displaced from the required positional relationship. Suitable means may be provided to prevent loosening of the connection, such as a lock washer 80 between the head of the screw 79 and the backward face of the bracket end portion 62.

Figure 3:
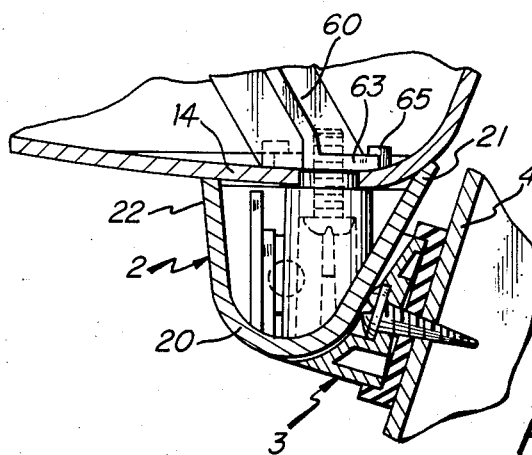
FIG. 3 is a transverse cross sectional view taken along the line 3—3 in FIG. 2.
Figure 4:
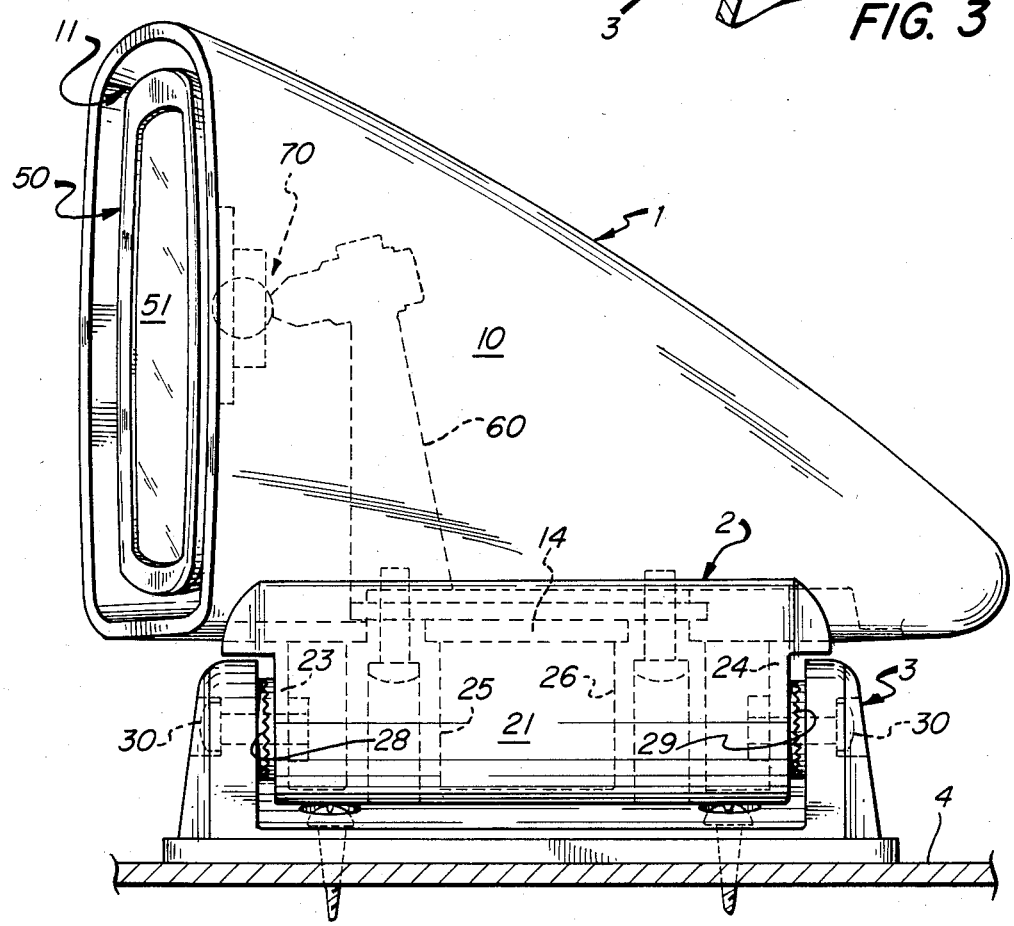
FIG. 4 is an elevational view of the inner side of the assembly shown in FIGS. 1-3.

The mirror head adaptor member 2 is preferably a substantially rigid yet resilient molding of any suitable thermoplastic resin, such for example as a product known as "CYCOLACT." As shown in FIG. 3, adaptor member 2 comprises a body wall 20 of substantially U-shaped cross section having inner and outer wall portions 21 and 22 adapted to fit against the outer side of the inner lower wall portion 14 of housing 10. The adaptor body also comprises oppositely disposed end walls 23 and 24 and upwardly extending tubular sections 25 and 26. The end walls extend upward to flanged ends 23a and 24a which bear against the housing wall portion 14. The tubular sections are open at their lower end and at their upper end have protrusions 25a and 26a of reduced diameter which fit into openings 27 formed in the housing wall portion 14 at a location beneath the trackway provided for the slide member 63 of the mirror support bracket.

The open lower ends of the tubular sections 25 and 26 permit screws 69 for fastening the mirror assembly 5 in place inside the housing 10 to be passed upwardly through these sections and their reduced ends 25a and 26a and then screwed through threaded openings in the foot portion slide member 63. This manner of assembly serves both to fasten the mirror assembly 5 in place inside the housing and to fasten the head adaptor member 2 to the outer side of the inner lower wall portion 14.

The end walls 23 and 24 of the head adaptor member are formed at their outer sides with radially serrated annular embossments 28 and 29 having central openings to receive bolts 30 which are passed through these openings and threaded into nuts 31 held at the inner sides of the adaptor end walls. As indicated by broken lines in FIG. 2, the adaptor end walls have a normal posture in which they are biased inwardly, yet from which they are elastically deformable to their position shown in full lines for clamping the head adaptor member and the mirror head to the mounting bracket 3 as described more particularly below.

The mounting bracket 3 comprises, on a suitable base plate or mounting pad 31, a rigid body portion 32 that is fastenable to the vehicle body part 4, and oppositely disposed arm portions 33 and 34 which extend from opposite ends of the body portion 32 to heads 35 and 36 from which a skirt wall 37 of the mounting bracket extends downward to bear against the vehicle body part 4 through the mounting pad 31.

The arm portions 33 and 34 of the mounting bracket are each formed with an opening that receives a ferrule 38 having a radially serrated inner face. The bolts 30 for securing the adaptor member pass through the ferrules of the mounting bracket arm portions and then through the openings in the adaptor end walls 23 and 24 to engage with the nuts inside those walls. When the head adaptor member 2 is in a normal posture with its end walls disposed as indicated by the broken lines in FIG. 2, the adaptor member can be inserted into the mounting bracket to bring its serrated embossments 28 and 29 into confronting relation with the serrated ferrule faces on the mounting bracket arm portions.

In that unclamped position of the adaptor member 2, the mirror head 1 with the attached adaptor member can be positioned in any desired angular relation to the mounting bracket 3 simply by being turned about the axis of the fastening screws 30. Then, when the desired angular disposition of the mirror head is obtained, which can be selected from within a wide range of available settings to suit the azimuthal position of the mirror to the driver's seat height and range of vision in the vehicle, a tightening of the bolts 30 will draw the adaptor end walls 23 and 24 against the mounting bracket arm portions 33 and 34 and clamp these parts together with their respective serrated faces securely interengaged, thus holding the adaptor member and the mirror head securely at the selected position on the vehicle.

When the mounting bracket 3 is fastened in place on the upper part of the door at the driver's seat of an automobile or like vehicle, the generally upright inner wall portion 15 of the housing 10 will be disposed close to the body and a window area of the vehicle in a way providing good rear view vision to the driver of the vehicle while also minimizing the wind drag normally associated with outside rear view mirrors. The mirror plate 51 then can be re-positioned azimuthally, if need exists, to suit a driver's range of vision by appropriately adjusting and re-setting the angular position of the head adaptor member 2 relative to the mounting bracket 3.

The mirror plate then is adjustable and settable securely at any desired angular position relative to the plane of housing opening 11 by simply pressing against the mirror plate member 50 so as to turn it about the ball 73 to the desired viewing position.

The embodiment of the invention illustrated in FIGS. 1-5 of the drawings is adapted for use on the left-hand side of a vehicle, as indicated schematically by the showing of mirror head 1 in FIG. 9.

A generally similar embodiment of the invention adapted for use on the right-hand side of a vehicle, as indicated schematically at 1R in FIG. 9, is illustrated in FIGS. 7 and 8 of the drawings in respect of components which differ in orientation from those of the embodiment already described.

In the right-side embodiment of FIGS. 7 and 8, the head adaptor member 2 and the mirror mounting bracket 3 may be substantially the same as the corresponding components of the described left-side embodiment. The mirror head 1R differs from the mirror head 1 of the left-side embodiment in respect of the orientations, and in some respects the configurations, of parts indicated by reference numerals bearing the suffix R. For instance, the laterally merged backwardly extending wall portions of the housing which circumscribe its front opening are somewhat differently sloped and oriented so that their forward edges border a front opening 11R which, though generally upright, extends more obtusely relative to the upwardly extending inner wall portion 15R of the housing than in the left-side embodiment. As a result, a mirror plate member 50R comprising a flat reflecting glass plate 51R can be employed in the right-side embodiment, to provide more reliable rear view vision than is obtained with the convex mirror plates often used for right-side rear view mirrors.

It is also to be noted that in the right-side embodiment there are adapted orientations, generally in mirror image relation to those of the left-side embodiment, of the mirror support bracket 60R, the means 5R interconnecting the bracket end portion 62R with the mirror plate member 50R, the bracket foot portion 61R, and the means 63R-65R for mounting the support bracket on the inner lower wall portion 14R of housing 10R. In the left-side embodiment of FIGS. 1-5, the mirror support bracket extends to its free end portion carrying the mirror plate assembly from a lower inner corner region of the housing at an acute angle relative to the lower wall portion 13 of the housing. In the right-side embodiment of FIGS. 7 and 8, a similar acute angular relationship exists, as may be seen by comparing the plan view in FIG. 8 with the plan view in FIG. 5, but the acute angle is disposed in a direction opposite to that of the angle in the left-side embodiment.

Although specific embodiments of the invention are illustrated in the accompanying drawings and described above in detail, it is to be understood that this is for the purposes of illustration. Modifications may be made in the form of the component parts or in their arrangements, and various substitutions of equivalents may be made, without departing from the new features of the invention which are intended to be defined by the appended claims.

What is claimed is:

1. An outside rear view mirror comprising:
   a mirror head constituted by a housing having a generally upright front opening circumscribed by laterally merged, backwardly extending wall portions of the housing including a lower wall portion joined laterally via an inner lower wall portion with an upwardly extending inner wall portion;

a mirror assembly inside said housing including a mirror plate to occupy said front opening, a mirror support bracket spaced behind said mirror plate, said bracket extending upwardly and outwardly to a free end portion thereof from a foot portion thereof mounted onto said inner lower wall portion of the housing, and means interconnecting said mirror plate and said bracket end portion for holding said mirror plate firmly yet adjustably in any selected position within a range of selectable viewing positions of said plate relative to said housing;

a head adaptor member fastened to and protruding downward from said inner lower wall portion of said housing;

a mounting bracket adapted to be fastened onto a body part of a vehicle;

and interengaging means on said mounting bracket and said adaptor member for holding the adaptor member and said mirror head securely yet adjustably at a selected position within a range of angular positions thereof relative to said mounting bracket to suit the height of the mirror plate on the vehicle to the range of vision of a driver seated in the vehicle.

2. A rear view mirror according to claim 1,
said support bracket extending to its said end portion from a lower inner corner region of said housing at an acute angle relative to said lower wall portion;
said inner wall portion of said housing being generally upright and disposable close to the body and a window area of the vehicle.

3. A rear view mirror according to claim 1 or 2, said foot portion being mounted in place by retainer means thereon slidingly engaged with retaining means fixed to and extending backward on said inner lower wall portion of said housing, and abutment means on said inner lower wall portion limiting backward displacement of said foot portion so that in a limiting backward position thereof said foot portion is held at a predetermined location thereof required for correctly positioning and fastening said mirror assembly inside said housing.

4. A rear view mirror according to claim 1 or 2,
said foot portion comprising a rigid slide member extending backward inside said housing;
said inner lower wall portion having laterally spaced flanges fixed thereto inside said housing and forming a trackway slidingly engaged with edge portions of said slide member to position said mirror assembly; and means fastening said slide member in place in said trackway.

5. A rear view mirror according to claim 1 or 2, said interconnecting means comprising;
a mirror backing member carrying said mirror plate;
a ball joint including socket means on said backing member, a ball seated in said socket means and having a ball post extending backward therefrom, and means tensioning said ball in said socket means to resist turning movement of said mirror plate;
and means fastening said ball post to said bracket end portion, including interlockable surfaces respectively on the end of said ball post and a forward side of said end portion and screw means extending through said end portion and threaded into a bore in said ball post for clamping said surfaces together so as to hold said ball post securely in a fixed angular position relative to said support bracket.

6. A rear view mirror according to claim 1,
said mounting bracket comprising a body portion fastenable to said vehicle body part and oppositely disposed arm portions on opposite ends of said body portion;
said adaptor member having oppositely disposed end walls arranged to fit between and fastenable to said arm portions;
said end walls and said arm portions respectively having mutually interlockable confronting surfaces thereon, and means extending through each said arm portion and the adjacent said end wall for clamping the said surfaces thereon in interlocked relation.

7. A rear view mirror according to claim 6,
said end walls having a normal posture in which they are biased inwardly sufficiently to disengage said confronting surfaces so that said adaptor member is displaceable relative to said mounting bracket, said end walls being elastically deformable by said clamping means to hold said surfaces in interlocked relation.

8. An outside rear view mirror comprising:
a mirror head constituted by a housing bounding a generally upright front opening;
a mirror plate positioned operatively in said front opening;
a mounting bracket comprising a body portion adapted to be fastened to a body part of a vehicle and oppositely disposed arm portions on opposite ends of said body portion;
a head adaptor member fastened to and protruding downward from a wall portion of said housing and having oppositely disposed end walls arranged to fit between and fastenable to said arm portions;
said end walls and said arm portions respectively having mutually interlockable confronting surfaces thereon for holding said mirror head at a selected angular position relative to said mounting bracket;
and means extending through each said arm portion and the adjacent said end wall for clamping the said surfaces thereon in interlocked relation;
said end walls having a normal posture in which they are biased inwardly sufficiently to disengage said confronting surfaces so that said adaptor member is displaceable relative to said mounting bracket, said end walls being elastically deformable by said clamping means to hold said surfaces in interlocked relation.

9. An outside rear view mirror comprising:
a mirror head constituted by a housing having a generally upright front opening circumscribed by laterally merged, backwardly extending wall portions of the housing including a lower wall portion joined laterally via an inner lower wall portion with an upwardly extending inner wall portion;
a mirror assembly inside said housing including a mirror plate to occupy said front opening, a mirror support bracket spaced behind said mirror plate, said bracket extending upwardly and outwardly to a free end portion thereof from a foot portion thereof mounted onto said inner lower wall portion of the housing, and means interconnecting said mirror plate and said bracket end portion for holding said mirror plate firmly yet adjustably in any selected position within a range of selectable viewing positions of said plate relative to said housing;

said foot portion being mounted in place by retainer means thereon slidingly engaged with retaining means fixed to and extending backward on said inner lower wall portion of said housing, and abutment means on said inner lower wall portion limiting backward displacement of said foot portion so that in a limiting backward position thereof said foot portion is held at a predetermined location thereof required for correctly positioning and fastening said mirror assembly inside said housing.

10. A rear view mirror according to claim 9, further comprising:
 a mirror head supporting adaptor member at the outer side of said inner lower wall portion;
 and fastening means extending from outside said housing through said adaptor member and engaging with said foot portion in its said limiting backward position for both fastening said mirror assembly in place inside said housing and fastening said adaptor member to said housing.

* * * * *